United States Patent [19]
Swanson

[11] 3,864,255
[45] Feb. 4, 1975

[54] SOLIDS SEPARATION SYSTEM
[75] Inventor: Roger Swanson, Wayne, Ill.
[73] Assignee: Babson Brothers Company, Oak Brook, Ill.
[22] Filed: Sept. 15, 1972
[21] Appl. No.: 289,268

[52] U.S. Cl. .................... 210/67, 210/73, 210/196, 210/257, 210/295, 210/436
[51] Int. Cl. ............................................. B01d 37/00
[58] Field of Search ............. 71/15, 21; 134/10, 34; 209/3, 4, 17, 268, 273, 300; 210/19, 65, 67, 69, 73, 97, 196, 197, 252, 257, 259, 262, 294, 295, 436, 472

[56] References Cited
UNITED STATES PATENTS

| | | | |
|---|---|---|---|
| 2,070,286 | 2/1937 | Lissauer et al. | 210/262 |
| 2,654,479 | 10/1953 | Driessen | 210/73 |
| 3,353,947 | 11/1967 | Kramer | 71/21 |
| 3,375,116 | 3/1968 | Anthony | 71/21 |
| 3,773,659 | 11/1973 | Carlson et al. | 210/7 |

*Primary Examiner*—Samih N. Zaharna
*Assistant Examiner*—Ivars Cintins
*Attorney, Agent, or Firm*—Wegner, Stellman, McCord, Wiles & Wood

[57] ABSTRACT

A method and apparatus for continuous batch-by-batch separation of solids from liquids, especially adapted for the separation of grass and grass-like components from liquid manure. The liquid manure is delivered from a batch holding or washing tank to an inclined screen and is washed with water as it flows down the screen. An endless conveyor belt screen receives and transports the grass from the lower end of the inclined screen. The conveyor screen is provided with a pair of squeezer rollers urged toward each other under high pressure. The conveyor screen carries the solid grasses through the nip between the squeezer rollers so that the squeezer rollers break capillaries within the grass and squeeze out moisture to reduce the moisture content of the grass below about 75%.

In a preferred form a second conveyor with squeezer rollers receives the grass from the first conveyor belt for a second squeezing operation to further reduce the moisture content below 50%. Alternatively the grass, after the first squeezing operation, can be subjected to a drying air blower or can be merely dumped into a bin and then retrieved from the bin using a solids auger conveyor. The processed grass is valuable as a bedding material for cattle.

The liquid fraction contains finely divided, suspended and colloidal solids recovered from the inclined screen and the conveyor screen and is recycled to the manure holding or washing tank until the grass of the batch in the holding tank has been washed sufficiently. Thereafter the liquid fraction is discharged from the system as effluent. The high nutrient value of the liquid fraction makes it an excellent liquid fertilizer. Advantageous features of the method and apparatus are also disclosed.

4 Claims, 2 Drawing Figures

SOLIDS SEPARATION SYSTEM

BACKGROUND OF THE INVENTION

1. Field of the Invention

This invention relates to the separation of fibrous solids from a liquid and more particularly relates to separation of grass from liquid manure and the reduction of the moisture content in the separated grass. In its more complete aspect the invention relates to the processing of liquid manure for the removal of grass suitable for use as bedding in a batch process.

2. Brief Description of the Prior Art:

The prior art is described in Carlson et al. U.S. Pat. No. 3,773,659, entitled "System for Processing Wastes," issued Nov. 20, 1973. That application discloses an overall system for the treatment of liquid cow manure and the like, including separation of grasses and further processing of the liquid fraction. It has been found that the grasses contained in liquid manure are excellent bedding materials for cow stalls. Recovery of such grasses from manure can save a feedlot or dairy operator a significant amount of money used to purchase straw, wood chips or the like for bedding.

SUMMARY OF THE INVENTION

Figure 1:
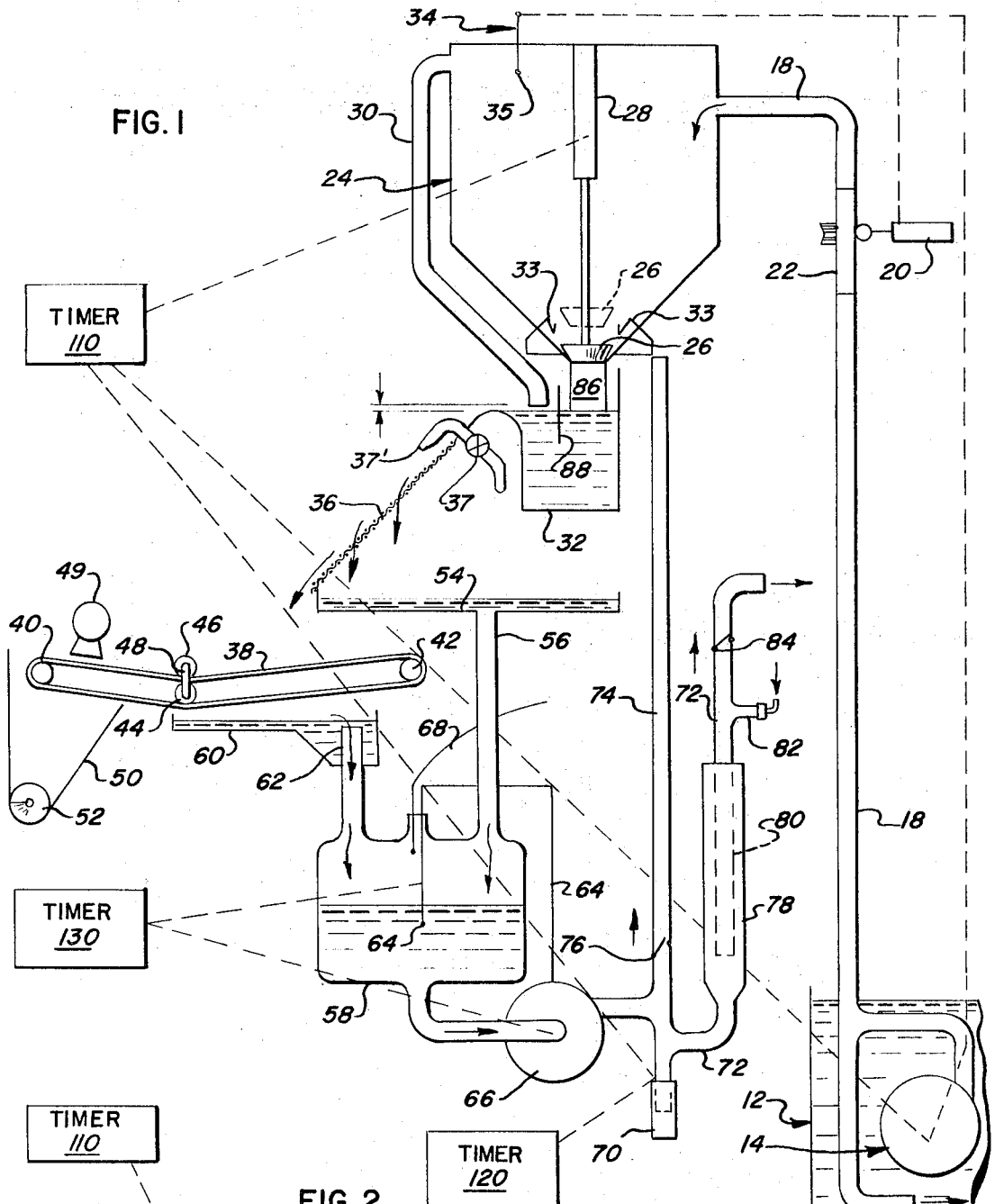
FIG. 1 is a flow diagram illustrating one form of this invention.

The present invention provides an improved system for separating solids, particularly fibrous solids, from liquids or slurries. The system is especially useful in the separation of grass from manure.

According to this invention the liquid manure is filtered in two filter zones. In a preferred form the first filter zone comprises an inclined screen on which solid grasses are separated from the liquid filtrate and washed. The grasses are then received by a second filter and pressed or squeezed with sufficient force to break capillaries in the grass for further removal of liquid.

The grass separation system is intended for use in combination with a manure holding or washing zone which holds a batch of manure to be treated. The manure is delivered from the holding zone to the first separation zone. Filtrate can be recycled to the holding zone for use as wash liquid, preferably under sufficient pressure to break up solid particles which may have settled to the bottom of the holding zone. When the liquid filtrate is no longer needed for washing, it can be discharged from the system. The grass is also recovered and a new batch of manure can be processed.

Specific features of interest in connection with the present invention include a self-cleaning pinch valve through which manure is delivered to the holding zone.

As another feature, when manure is dumped from the holding zone, the holding zone is vented through a vent tube, the open end of which is positioned to be closed by a predetermined level of dumped manure. This controls the dumping to provide delivery of manure to the first separation zone in intermittent surges so that the zone does not become overloaded.

Still another improvement is in the backwashing of a filter in the effluent discharge line during operation of the system.

While this invention is susceptible of embodiment in many different forms, there is shown in the drawings and will herein be described in detail specific embodiments of the invention with the understanding that the present disclosure is to be considered as an exemplification of the principles of the invention and is not intended to limit the invention to the embodiments illustrated.

DESCRIPTION OF THE PREFERRED EMBODIMENTS

Turning first to FIG. 1 there is shown a preferred flow scheme for apparatus of this invention and for use in carrying out the method of this invention. The apparatus is best described with reference to the method.

Accordingly, manure from pit 12 is pumped by manure pump 14 upward through manure delivery line 18. The manure pump 14 and delivery line 18 are provided with a recirculation line and orifice shown at 16 for the purpose of maintaining the manure in pit 12 in a state of agitation while pump 14 is running.

A clamp valve 20 is provided for the purpose of opening or closing line 18. Valve 20 is positioned to squeeze or relax on a flexible line portion 22 of line 18 and is preferably a slow closing and slow opening valve. Advantageously valve 22 can be a hydraulic valve pressured with tap water which is diverted between the hydraulic chambers by a suitable solenoid (not shown).

With valve 20 open and pump 14 running manure is pumped from pit 12 through line 18 and into holding or a washing tank 24. In the device specifically described herein tank 24 has a capacity of about 30 gallons and pump 14 fills tank 24 within about one minute. During filling of tank 24, valve member 26 is maintained seated in the tank outlet as shown in full lines in FIG. 1. Valve 26 is operated by another hydraulic cylinder as shown at 28, which can again be actuated by diverting tap water using a suitable solenoid valve.

Once the manure level in tank 24 reaches liquid level control 35, the liquid level control shuts off pump 14 and actuates valve 20 to close. Because valve 20 closes slowly some liquid manure is siphoned back down line 18 causing the flexible line portion 22 to flex inward and outward, a self-cleaning action which minimizes the chances of solid materials blocking valve 20 from closing completely. Once tank 24 is filled wash water begins entering tank 24 through nozzles 33 as will be described herein below. The nozzles 33 jet wash water downward in the bottom of tank 24 inhibiting settling of solids in tank 24 and assisting in breaking up solids. The manure overflows through pipe 30 and into weir tank 32 from which it flows down an inclined screen 36. While the manure is on screen 36 it is washed with tap water from valved water supply line 37 via nozzle 37'. Nozzle 35 is directed in a downward position to help move the solids down screen 36 and onto an endless belt conveyor screen 38 which moves in the direction shown by the arrows in FIG. 1. The material delivered from screen 36 to screen 38 is the grass from the manure since other solid materials have been broken up to a sufficiently finely divided form to pass through screen 36.

Screen 38 is mounted on two idle rollers 40 and 42 and a drive roller 44 driven by a suitable electric motor (not shown). A rubber squeeze roller 46 is tightly mounted against drive roller 44, e.g., under a pressure of about 300 psi, by a clamp device 48 so that as the grass is carried by screen 38 between rollers 44 and 46 it is squeezed with sufficient pressure to break capillaries in the grass. Thus, a substantial amount of additional moisture in the grass is removed. An air blower 49 can be provided to further dry the grass on screen 38, if desired. The grass is then delivered from the end of screen 38 into a bin 50 having a solids auger conveyor 52 for delivering the grass laterally from bin 50 through a side opening, e.g. directly to cow stalls or other cattle bedding area.

Returning now to the first separation zone, screen 36 is preferably a dewatering type screen in which the drainage unit comprises a series of spaced bars extending transversly to the direction of flow. The surface contour and arrangement of the bars is such to produce an undulatory motion of the liquid as it progresses from one end to the other of the drainage unit. Suitable devices are described, for example, by M. E. Ginaven in U.S. Pat. No. 3,451,555, patented June 24, 1969.

The water which falls through screen 36 is collected in a tray 54 for delivery down drainpipe 56 into a wash water supply tank 58. The liquid which passes through screen 38, e.g., due to squeezing action of roller 46, falls into a collection tray 60 and is delivered over a standpipe 62 and into tank 58. Standpipe 62 is provided so that any solid materials that might pass through or across screen 38 are collected in tray 60 and little if any will be delivered into tank 58. Tray 60 can be cleaned periodically.

As the level of liquid tank 58 increases it is sensed by a liquid level control 64 which in turn actuates an effluent pump 66 to start pumping and pump for a time determined by timer 130 (3 sec.). A fail-safe liquid level control 68 is also provided in tank 58 to close down the entire system in case the liquid in tank 58 rises to the top of the tank.

In the outlet line from pump 66 there is provided an effluent diverter valve 70 for diverting the effluent through outlet line 72 or through recirculation line 74 to nozzles 33.

An enlargement 78 is provided in outlet line 72 and contains a screen filter 80 through which the effluent passes on its way out of the system. In line 72, above the filter 80, there is a one-way air vent 82 and a check valve 84 so that with pump 66 off and diverter valve 70 in its position opening line 72, one-way air vent 82 permits air to enter line 72 below check valve 84. Filter 80 is thereby backwashed by water in line 72 and the backwash is delivered into pump 66. Thus solids trapped by filter 80 will be returned to pump 66. Valve 70 can then be moved to open line 74 and close line 72 and when pump 66 is started the backwashed solids will be delivered back into tank 24 for reprocessing.

Figure 2:
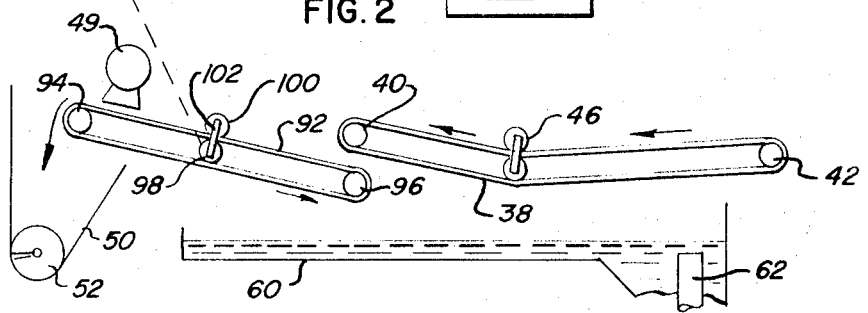
FIG. 2 in a partial flow diagram illustrating a modification of FIG. 1.

The system shown in FIG. 2 is the same as that in FIG. 1 except that second endless belt conveyor screen 92 is provided for receiveing grass from screen 38 and the auger 52 is omitted. Screen 92 is mounted on idle rollers 94 and 96 and is driven by drive roller 98 against which squeeze roller 100 is spring loaded by a suitable loading device 102. It will be apparent that as the grass is conveyed between rollers 100 and 102 it will be further crushed or squeezed and more water removed. Tray 60 is extended to catch the liquid squeezed out by rollers 100 and 102.

Returning now to FIG. 1 a timer 110 is provided for controlling operation of the system through an overall timed cycle. In the specific system described the timed cycle is for a total of fifteen minutes. The timed cycle includes seriatim: a fill segment, a wash segment and a dump and effluent discharge segment. At the start of the cycle pump 14 is already on and diverter valve 70 is in its position diverting effluent into outlet line 72. Pinch valve 20 is opened and dump valve 26 is closed by timer 110 to start the fill segment. The conveyor screen 38 and solids auger 52 remain on during the timed cycle.

It takes about 1 minute to fill tank 24 at which time the liquid level control 34 turns off pump 14 and closes pinch valve 20 with its self-cleaning action as described above. This ends the fill segment. At one minute of the cycle the timer starts a timed ten minute wash segment to be followed by a four minute dump segment. Accordingly, timer 110 controls diverter valve 70 to close line 72 and open line 74. The timer also opens valved line 37 for delivery at a rate of about 0.33 gal/min. through nozzle 37' and down screen 36. As tank 58 fills to the level of the liquid level control 64, control 64 starts pump 66 which delivers liquid through line 74 for a timed cycle or pulse of about 3 seconds as per timer 130. The pulse of pump 66 will repeat each time the liquid in tank 58 rises to trigger control 64. Another timer 120 also detects the length of time elapsed between pulses of pump 66 and when they decrease below a preselected level, 22½ seconds in the instant case, the timer 120 overrides timer 110 and causes diverter valve 70 to open outlet line 72 while closing line 74. Pump 66 pumps water into line 72 for one three second pulse. When pump 66 stops, air is admitted to line 72 by air vent 82 and filter 80 is backwashed into pump 66.

The length of lapsed time between pulses of pump 66 for triggering effluent discharge through the filter is selected to control the degree of agitation in washing tank 24. A short time (approx. 15 sec.) will keep manure in washing tank 24 highly agitated during the wash segment. A long time (approx. 35–40 sec.) will allow more settling in washing tank 24 and keep it more quiescent. Because of addition of water to the system during the wash segment, the lapsed time between pump pulses will become progressively less toward the end of the wash segment, or until the effluent is discharged for one pulse of pump 66.

After eleven minutes in the timed cycle, i.e., after the 1 minute fill segment and the 10 minute wash segment, the 4 minute dump segment begins. The timer 110 shifts diverter valve 70 to open line 72, opens the dump valve 26 and turns on the manure pump 14. Valve 20 is still closed so that the manure pump 14 agitates the manure in tank 12 via recirculation line 16 in getting ready to supply manure for the next cycle. The tank 24 drains into weir tank 32 and runs down screen 36 and conveyor 38 as before.

It will be noted that the overflow pipe 30 is used as an air vent during dumping of tank 24. The open end of overflow pipe 30 is positioned just slightly above the weir level of tank 32 so that as tank 32 fills and the overflow onto screen 36 increases, the level of liquid in tank 32 blocks the end of pipe 30.

After about 4 minutes the dump segment is terminated by timer 110 and the next timed cycle begins with valve 20 opening to permit tank 24 to be filled. Usually at the beginning of each cycle, there will be liquid remaining in the system from the previous cycle, i.e., in tanks 32 and 58 and in tray 60 so that a long wait is not required to build up liquid for triggering pump 66.

The system shown in FIG. 2 can also be timed through a cycle. However, it has been found that the second conveyor screen 92 does not have to be in operation throughout the entire cycle. In fact, it is sufficient to operate it for only about one minute just after the wash segment, i.e., the first minute of the dump segment.

In operating a system as described herein it was found that the manure from a dairy operation supplied approximately 1½ to 2 times the amount of bedding required by the cows producing the manure processed.

I claim:

1. A method of separating grass from liquid manure in a manure pit which comprises pumping a batch of the manure from said pit to a holding zone, delivering wash liquid to the bottom of the holding zone under sufficient force to break up solid settled material and wash grass in the holding zone, permitting overflow from the holding zone to a weir tank and from the weir tank down an inclined screen for separating the solid grasses from the liquid fraction of the manure, washing said grasses down said screen to a pressing zone, pressing the grasses in the pressing zone under sufficient force to break capillaries and reduce the grass water content to less than 50% by weight, recovering grasses from the pressing zone for use as bedding, recovering filtrate and wash water from the separation zone and pressing zone and delivering recovered filtrate and wash water to said holding tank as wash liquid whereby additional liquid manure over flows to said weir tank, continuing the foregoing steps until the grass in the washing tank is washed, dumping the contents of the washing tank in increments into said weir tank for processing of the remaining grasses by washing on the inclined screen and pressing in said pressing zone and discharging the recovered liquid portion as effluent.

2. Apparatus for separation of grass from liquid manure comprising a holding tank for holding a batch of manure, and having a valved bottom outlet, a weir tank for receiving manure by gravity flow from said outlet when the valve is open, an overflow and vent tube for directing overflow from the holding tank to the weir tank when the valve is closed and for venting the holding tank when the valve is open, said tube terminating adjacent but above the weir level of said weir tank whereby the end of said tube is closed by rising manure surging over the weir, and moving grass away from the weir tank while separating grass from the manure.

3. Apparatus for treating liquid manure which comprises a manure pit, a holding tank, means for pumping the manure from said pit to the holding tank, means for delivering wash liquid to the bottom of the holding tank under sufficient force to break up solid material, a weir tank, means permitting overflow from the holding tank to the weir tank, an inclined screen for receiving manure from the weir tank and for separating solid grasses from the liquid fraction of the manure, means for washing said grasses down said screen to a pressing zone, means in the pressing zone for pressing the grasses under sufficient force to break capillaries and reduce the grass water content to less than 50%, means for recovering grasses from the pressing zone for use as bedding, means for recovering filtrate and wash water from the screen and the pressing means, means for delivering recovered filtrate and wash water to said holding tank as wash liquid whereby additional liquid manure overflows to said weir tank, means for dumping the contents of the wash tank in increments into said weir tank for processing of the remaining grasses through washing on the inclined screen and pressing by said pressing means and means for discharging the recovered liquid portion from the dumped contents as effluent.

4. A method for separating grass from liquid manure which comprises delivering the liquid manure to a holding zone, directing the liquid manure from the holding zone to a primary separation zone and screening solid grass from said manure in said primary separation zone while washing the manure with water, delivering the grass from said primary separation zone to a secondary separation zone, squeezing said grass in said secondary separation zone with sufficient force to break capillaries in the grass and further reduce the moisture content of the grass, recovering liquid from said primary and secondary separation zone as fractions separate from said grass, recycling at least a portion of the recovered liquid as washing liquid to said holding zone, delivering a portion of the recovered liquid as effluent from the system, and filtering the effluent in a vertical discharge pipe as it is discharged from the system, then venting the discharge pipe above the filter whereby the liquid in the discharge pipe flows back through the filter and backwashes the same, and delivering the backwash liquid to the holding tank.

* * * * *